United States Patent [19]
Demay et al.

[11] Patent Number: 5,923,381
[45] Date of Patent: Jul. 13, 1999

[54] DEVICE AND METHOD FOR PROCESSING A SIGNAL WITH A SUBJECT MOVING AGAINST A COLORED BACKGROUND

[75] Inventors: Alain Demay, Sartrouville; Michel Le Lan, Cergy St. Christophe, both of France

[73] Assignee: Thomson Broadcast Systems, Cergy Pontoise Cedex, France

[21] Appl. No.: 08/755,632

[22] Filed: Nov. 25, 1996

[30] Foreign Application Priority Data

Nov. 23, 1995 [FR] France .................................. 95 13952

[51] Int. Cl.[6] ...................................................... H04N 9/75
[52] U.S. Cl. .......................... 348/592; 348/586; 348/588; 348/589; 348/578; 345/118; 345/150; 345/168; 358/537; 358/538; 358/540; 358/22 CK; 382/284
[58] Field of Search ...................................... 348/586, 587, 348/588, 589, 590, 592, 600, 593, 578, 584, 585; 345/113, 114, 118, 150, 168; 358/22 CK, 537, 538, 540; 382/284; H04N 9/75

[56] References Cited

U.S. PATENT DOCUMENTS

| | | | |
|---|---|---|---|
| 5,003,491 | 3/1991 | Heckt | 364/518 |
| 5,051,828 | 9/1991 | Chaplin | 348/590 |
| 5,117,283 | 5/1992 | Kroos | 348/586 |
| 5,202,762 | 4/1993 | Fellinger | 348/586 |
| 5,574,511 | 11/1996 | Yang | 348/586 |
| 5,657,395 | 8/1997 | Hirota | 382/163 |

FOREIGN PATENT DOCUMENTS

| | | |
|---|---|---|
| 0 014 665 | 2/1980 | European Pat. Off. . |
| 0 074 824 | 9/1982 | European Pat. Off. . |
| 0 285 494 | 3/1988 | European Pat. Off. . |
| 4017878 A1 | 12/1991 | Germany . |
| WO 91/05443 | 4/1991 | WIPO . |

OTHER PUBLICATIONS

Digital Chroma–Key, by V. G. Devereux, BBC Research Department, UK, Sep. 21–25, 1984, International Broadcasting Convention, pp. 148–152.

Signal Processing for a Digital HDTV Chromakey Mixer, Frank Fechter and Christof Ricken, Technical University of Braunschweig, Germany, Feb. 25, 1993, pp. 417–423.

Chromakey in Future Studio Systems, R. Rawlings and N. Seth–Smith, IBA Technical Review, Mar., 1982, pp. 57–69.

*Primary Examiner*—John K. Peng
*Assistant Examiner*—Wesner Sajous
*Attorney, Agent, or Firm*—Oblon, Spivak, McClelland, Maier & Neustadt, P.C.

[57] ABSTRACT

A device and method that overlays, onto a new colored background a subject clipped from a source video image having a subject moving against a first colored background. A clipping key KD is calculated which makes it possible to separate the color space representing the image into three regions, a first region defining a volume representing the first colored background, a second region defining a volume representing the subject, and a third region representing a region of transition between the first colored background and the subject. A video image VD representing the subject moving against the new colored background formed according to the formula:

$$VD = KD \times \text{subject video} + (1-KD) \times \text{background video},$$

where "subject video" and background video respectively represent a video image containing the subject and the video image of the new colored background. The above described device and method are applicable for use in apparatuses such as, for example, video mixers or autonomous devices for clipping and overlaying video images.

31 Claims, 14 Drawing Sheets

RELEVANT ART

DEVICE AND METHOD FOR PROCESSING A SIGNAL WITH A SUBJECT MOVING AGAINST A COLORED BACKGROUND

This application is related to copending patent application, entitled "DEVICE AND METHOD FOR DETERMINING A KEY FOR CLIPPING A SUBJECT MOVING AGAINST A COLORED BACKGROUND", Ser. No. 08/755,645 filed herewith, which is incorporated herein by reference.

BACKGROUND OF THE INVENTION

1. Field of the Invention

The invention relates to a device and method for overlaying onto a new colored background a subject clipped from a source image, and more particularly to a device and method of processing the source image having a subject moving against a first colored background in such a way as to improve, after overlaying, the image rendition constituted by the subject moving against the new colored background. Thus, the invention relates to any electronic device or apparatus implementing such a method of processing such as, for example, video mixers or autonomous devices for clipping or overlaying video images commonly referred to as "chroma-keyers". Such electronic devices or apparatuses are typically used, for example, in television studio equipment.

2. Discussion of the Background

Conventional overlay methods include a step of calculating a subject clipping key "KD". The corresponding video image "VD" representing the subject which has been overlaid on a new background is then given, in the case of multiplicative mixing, by the following function:

$$VD = KD \times VS + (1-KD) \times VF,$$

where "VS" represents the source image which includes the subject moving against a first colored background and "VF" represents the new colored background onto which the subject is to be overlaid.

Following this multiplicative mixing, shades of the color of the first background persist around the subject overlaid on the new background. According to conventional techniques, these residual color shades are eliminated by adding, around the outline of the subject, a color that is complementary to the color of the first background. For this purpose, a specific decolorization key, which is calculated as a function of the value of the clipping key KD and is predetermined with the aid of templates, allows the adding of a complementary color to the color of the first background to the outline of the subject.

The relevant art is described in more detail with reference to FIG. 1, which is a schematic diagram of a conventional algorithm that obtains an overlaid video image representing a subject against a new background. Each pixel of the source video image "VS" includes three components "cbs", "crs", and "ys" which respectively refer to a blue color difference chrominance component, a red color difference chrominance component and a luminance component.

The luminance and two chrominance data are in a known format 4:2:2, where the sampling frequency for the luminance components is 13.5 MHZ while that for the chrominance components is 6.75 MHZ. It is necessary to interpolate the train of chrominance components cbs, crs, this being in the format 2:2, into a train of chrominance components cb, cr in the format 4:4. The interpolation operator 1 provides for this interpolation, according to traditional interpolation methods. The chrominance components of the pixels of the source video image VS are suppressed during line blankings so that the interpolated components situated at the start and at the end of a line are not disturbed by the line blanking signal.

The luminance samples, ys, of the source video image are delayed by the delay R1 and output therefrom as delayed luminance samples "y" so as to compensate for the delay suffered by the chrominance samples cbs and crs in the course of the interpolation operation 1.

The samples cb, cr, and y are applied to a "calculation of the clipping key" operator 2 for calculating the clipping key KD. As is appreciated in the relevant art, the clipping key KD has the function of distinguishing between the first colored background of the source video image and the subject itself. It is then necessary to define in a color space a volume representing the first colored background in such a way as to be able to extract the subject from the first colored background so that the subject may be overlaid against a new background. The calculation of the clipping key (KD) operator 2 is followed by a masking and filtering operator 3, which making it possible to remove part of the details which belong to the subject from being likened to the colored background. The example most often encountered is the loss of colorimetry of the eyes of a person. Introducing the masking and filtering operation makes it possible to nullify, locally, a level of the clipping. The masking and filtering operator is represented with dashed lines in FIG. 1 because, although frequently used, is not an essential component.

A final clipping key KDF is output by the masking and filtering operator 3 and is applied to an invertor 6 so as to transform the cue KDF into an inverse cue 1−KDF (where "cue" refers to an indication, or "hint" as to how the pixels are to be further processed).

A mixing operation is then carried out with the aid of two multipliers 4 and 5 and an adder 7, as will now be described. The KDF and the source video image is applied to the multiplier 4, after the source video image has been delayed in delay R2 which makes it possible to compensate for the delays corresponding to the successive operations 1, 2 and 3. Similarly, the background video VF is applied with the inverse key (1−KDF) to the multiplier 5. The respective products of the multipliers 4 and 5 are added by an adder 7. The resultant sum from the adder 7 is then multiplied in a multiplier 8 with a decolorization key KDEC.

As mentioned earlier, the decolorization key KDEC, calculated as a function of the clipping key KD, makes it possible to act on the outline of the subject so as to effect the decolorization of this outline. Finally, the desired video signal VD is output by the multiplier 8.

This conventional method suffers from numerous drawbacks. Apart from the fact that the decolorization key KDEC is predetermined with the aid of templates, which induces a correction that masks the details of the subject, the intervention of the multiplier 8 causes a degradation of the signal output by the adder 7.

As identified and addressed by the present invention, the conventional techniques result in poor quality decolorization. Consequently, a heavy outline emerges that masks the details of the subject and is a by-product of the poor quality decolorization.

SUMMARY OF THE INVENTION

Accordingly, one object of this invention is to provide a novel device and method for overlaying a clipped subject from a first colored background onto a new colored background that overcomes the above-mentioned limitations of existing methods and systems.

Another object of the present invention is to provide a device and method for overlaying onto a new colored background a subject arising from the clipping of a source video image consisting of the subject moving against a first colored background.

According to the present invention, a key KD is calculated in a way that makes it possible to separate a color space representing a source video image into three regions. A first region defines a first volume representing the first colored background, a second region defines a second volume representing the subject, and a third region represents a region of transition between the first colored background and the subject. A mixing process is performed such that the video image VD representing the subject moving against the new colored background is given by the formula:

$$VD = KD \times \text{subject video} + (1-KD) \times \text{background video},$$

where the phrases "subject video" and "background video" respectively represent a video image containing the subject and the video image of the new colored background. The video image containing the subject arises from a processing step that identifies the subject in the source video image where the subject is moving against the first colored background. This processing step is controlled by a signal "D2" that arises from a step of detecting at least one of the regions, where the said detection step is controlled by the clipping key KD.

According to the preferred embodiment of the invention, the processing step includes a step of decolorization of the outline of the subject and/or a step of setting to black those pixels belonging to the first colored background. However, more generally, the invention relates to any type of additional processing performed on the source video image.

Similarly, the invention relates to any electronic apparatus, such as mixers or "chroma-keyers", which implement the method steps of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
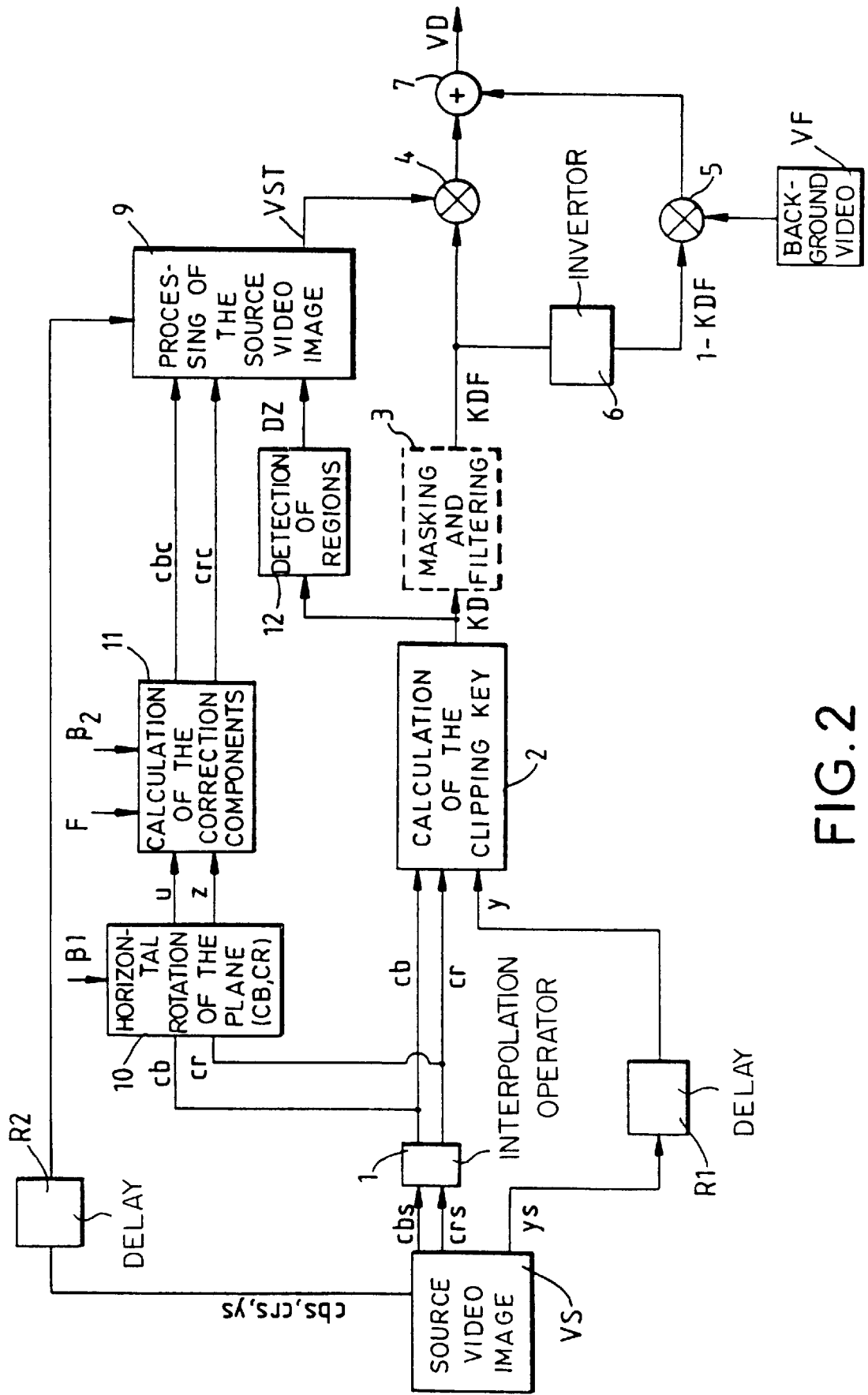
FIG. 2 is a block diagram of a device that obtains an overlaid video image representing a subject against a new background according to the present invention.

Referring now to the drawings, wherein like reference numerals designate identical or corresponding parts throughout the several views, and more particularly to FIG. 2 thereof, there is illustrated a schematic block diagram of the set of operators that make it possible to obtain an overlaid video image representing a subject against a new colored background, according to the present invention.

Figure 1:
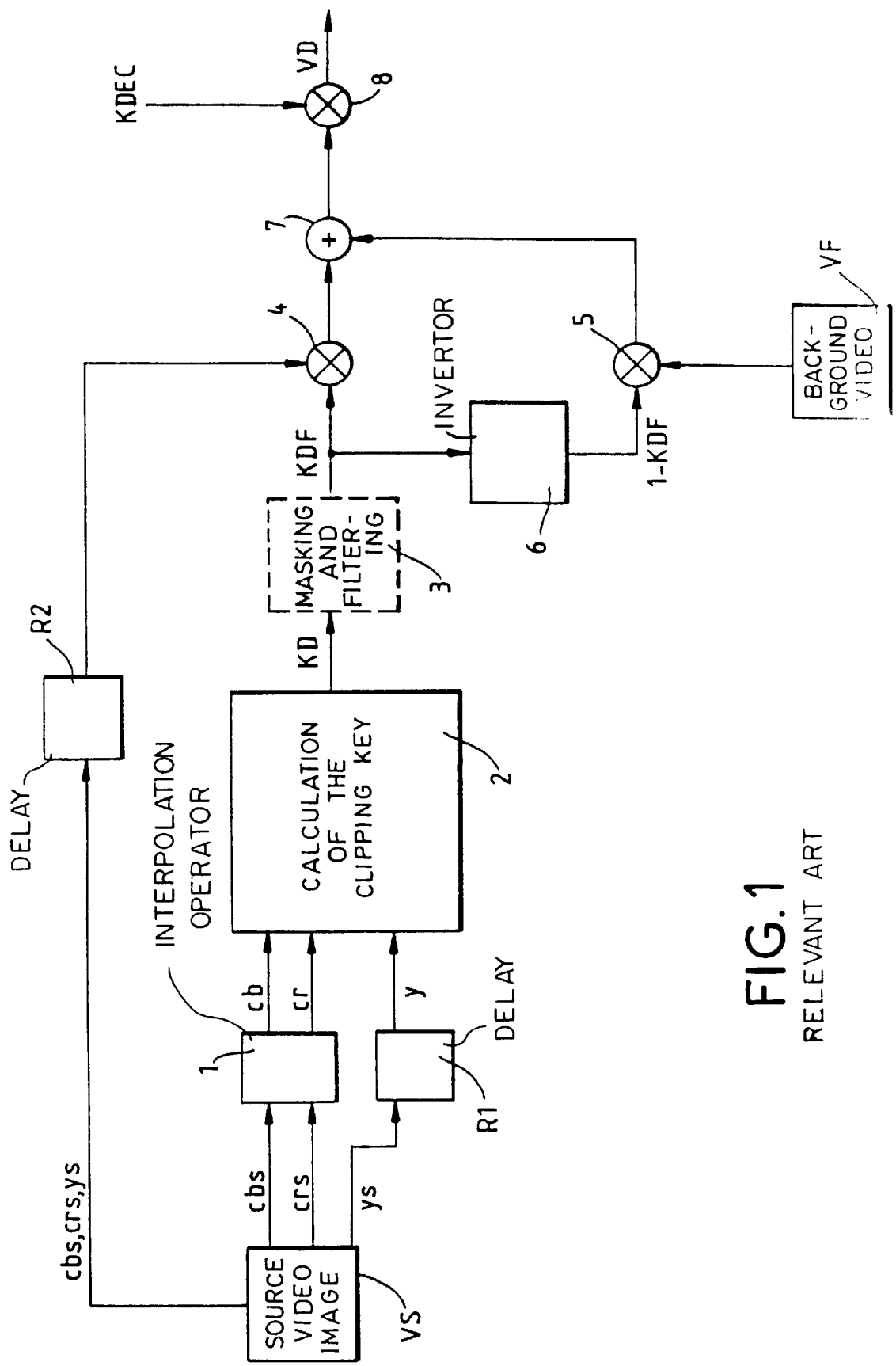
FIG. 1 is a block diagram of a relevant art apparatus the that obtains an overlaid video image representing a subject against a new background.

Represented in FIG. 2 are the interpolation operator 1, the delays R1 and R2, the operator for calculating the clipping key 2, the masking and filtering operator 3, the invertor 6, the multipliers 4 and 5 and also the adder 7 the functions of which are identical to those described in FIG. 1. According to the present invention, each of the above components (as well as components 9–12, discussed below) are implemented as a computer-based process, where the computer contains a microprocessor, bus, RAM, ROM, peripheral I/O ports, network terminal, and local mass storage, such as are available in the BRAVO LC 4/66C personal computer available from AST corp. Appropriate software coding can readily be prepared by skilled programmers based on the teachings of the present disclosure, as will also be apparent to those skilled in the relevant art(s). Alternatively approaches for performing the function, such as through digital logic, application specific integrated circuits, programmable logic devices, etc., may be employed as well.

According to the invention, in order to simplify the interpolation calculation, the achromic level which corresponds, for example, to the level 512 for a video signal coded on 10 bits, is converted into an arithmetic zero by inverting the value of the high-order bit. The luminance samples y are then shifted in scale so as to make the luminance zero correspond with the arithmetic zero and are coded over a number of bits identical to that of the chrominance samples cb, cr.

According to the invention, the decolorization is performed by a source video image processing operator 9. The source video image processing operator 9 performs a colorimetric correction by adding, to each of the blue and red color difference chrominance components of each pixel of the transition region, the quantity of complementary color required to render the pixels of this region substantially achromic.

Thus, a correction blue color difference chrominance component cbc is applied to each blue color difference chrominance component of each pixel of the transition region and, similarly, a correction red color difference chrominance component crc is applied to each red color difference chrominance component of each pixel of the transition region.

A "detection of regions" operator 12 detects the regions based on the clipping key KD and generates a signal "DZ" that is applied to the source video image processing operator 9 so as to allow the application of the correction components cbc, crc to adjust the pixels of the transition region.

The video signal applied to the multiplier 4 is then a subject video signal "VST" arising from the processing of the source video image VS and the mixing equation according to the invention supplies the desired video VD such that:

VD=KDF×VST+(1−KDF)×VF, or else

VD=KD×VST+(1−KD)×VF in the case in which the masking and filtering operation 3 is not carried out.

Preferably, decolorization is performed before the mixing operation.

The correction chrominance components cbc and crc which are applied to the source video processing operator 9 are output by a "calculation of the correction components" operator 11 which receives as input the components "u" and "z" representing the chrominance coordinates of a pixel in a (U, Z) plane arising from a rotation in a "horizontal rotation of the plane" operator 10 of angle β1 of the chrominance plane (CB, CR).

The calculation of the correction components operator 11 will be described later in reference to FIG. 3.

The horizontal rotation of the plane operator 10 accepts as input an angle β1 of the chrominance plane (CB, CR) which makes it possible to define the two new axes U and Z. Thus, by rotation of angle β1, the axis CR gives the new axis Z which points in the direction of the hue of a point of the colored background; the axis CB gives the new axis U perpendicular to the axis Z such that the trihedral (U, Z, Y), where Y represents the luminance axis of the color space (CB, CR, Y), is a right-handed trihedral.

The horizontal rotation of the plane operator 10 (CB, CR) carries out its operation in two stages. In a first stage, a microprocessor in the operator 10 loads the cues sin(β1) and cos (β1) during field blanking and a multiplication operator implemented by the microprocessor calculates the products cr×cos (β1), cr×sin (β1), cb×cos (β1), and cb×sin (β1), for each point of the image, during the active field. The cues u and z are provided at the frequency of 13.5 MHZ and the cues cos (β1), sin (β1) are provided at the frequency of 27 MHZ. It follows that, at the output of the multiplication operator in the microprocessor, the cues are multiplexed at the frequency of 27 MHZ.

In a second stage, the multiplexed cues are demultiplexed and matrixed to obtain the signals u and z at the frequency of 13.5 MHZ.

The matrix relation can be written:

$$\begin{pmatrix} u \\ z \end{pmatrix} = \begin{pmatrix} \cos(\beta 1)\sin(\beta 1) \\ -\sin(\beta 1)\cos(\beta 1) \end{pmatrix} \begin{pmatrix} cb \\ cr \end{pmatrix}$$

Figure 3:
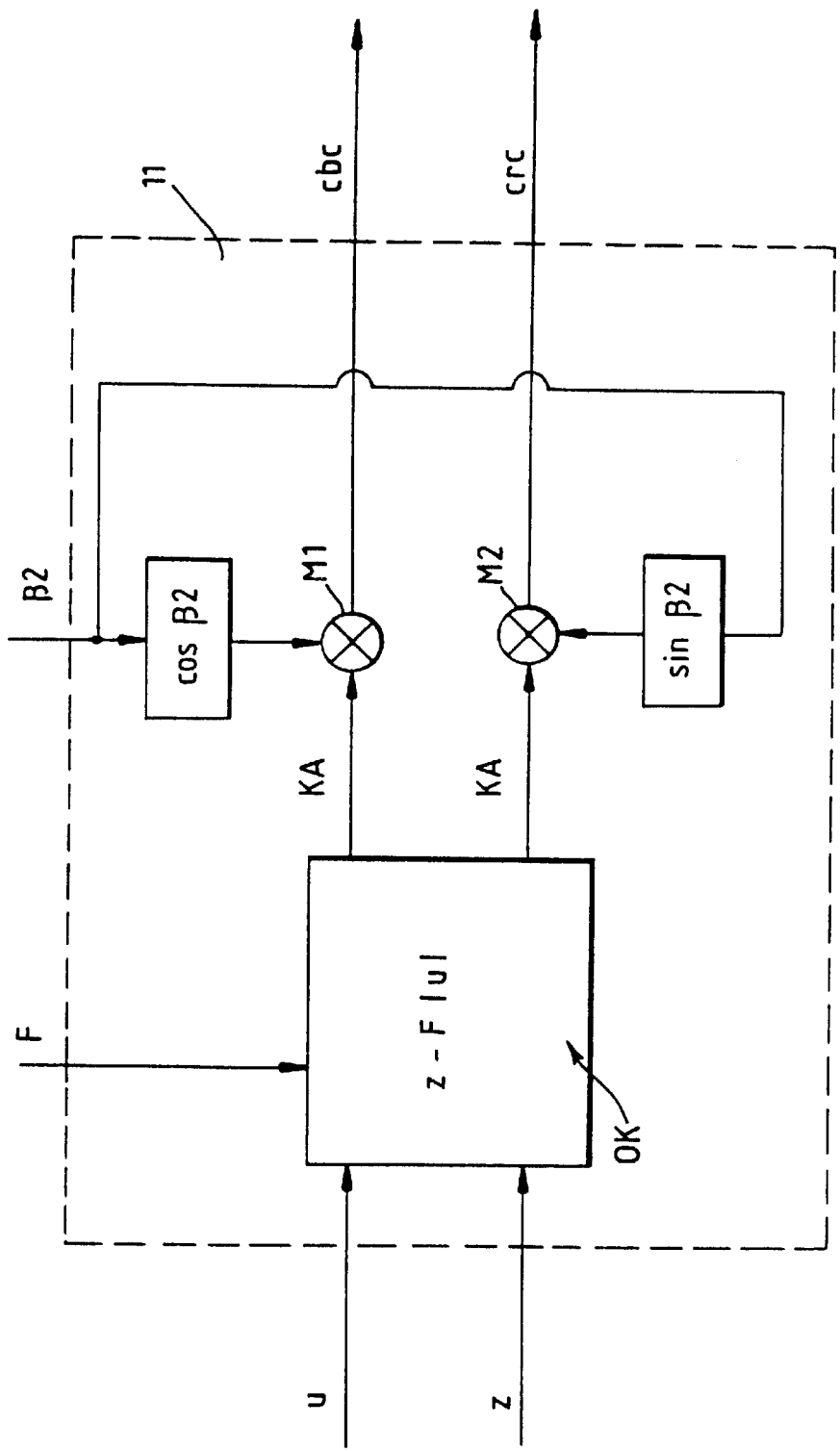
FIG. 3 is a block diagram of a detailed schematic of a "calculation of the correction components" element of FIG. 2.

FIG. 3 describes the operation of the calculation of the correction components operator 11.

According to the preferred embodiment of the invention, the complementary color amount is calculated with the aid of a decolorization key KA such that:

$KA=z-F|u|,$ where z and |u| are the coordinates of each pixel along the respective axes Z and U, |u| denoting the absolute value of the quantity u, and F is a parameter for adjusting the value of KA. The parameter F makes it possible to modulate the value of KA according to the value of |u|, that is to say according to the distance separating the pixel from the Z axis.

Thus, with constant F and constant |u|, the value of KA increases with increasing z while, with constant z and constant F, the value of KA decreases as |u| increases.

Advantageously, according to the invention, it follows that, for example, during movements of the subject in front of the first colored background, the correction chrominance components cbc and crc take on values which make it possible to adapt to the variation in the chrominance components of the pixels of the transition region.

The key KA output by the operator OK (FIG. 3) is applied to two multipliers M1, M2. The quantity cos (β2) is also applied to the multiplier M1, and the quantity sin (β2) is applied to the multiplier M2, where the angle β2=β1+π. It follows that the blue chrominance correction samples cbc and red chrominance correction samples crc output by the respective multipliers M1 and M2 contain the desired proportion of complementary color to be added to the respectively blue and red chrominance components of the pixels of the subject video belonging to the transition region. Advantageously, the amount of correction is thus tailored to each pixel.

According to the preferred embodiment of the invention, the decolorization key can be written KA=z−F|u|. However, the invention relates more generally to any type of key making it possible to generate correction samples cbc and crc intended to be added to the respective blue and red chrominance components of each pixel of the subject video belonging to the transition region so as to render these pixels substantially achromic.

Figure 4:
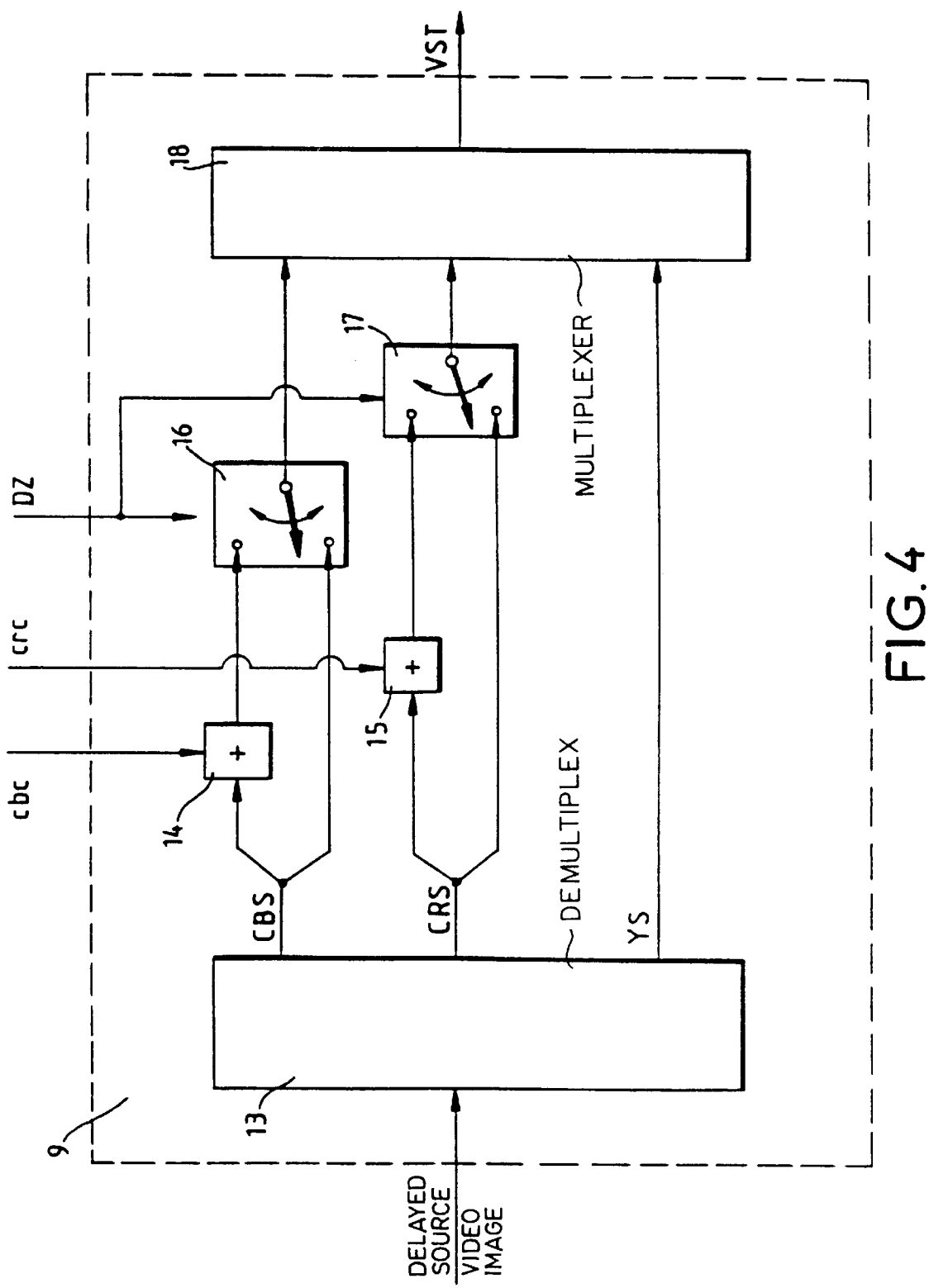
FIG. 4 is a block diagram of a detailed schematic of a "processing of the source video image" element of FIG. 2.

FIG. 4 represents a first embodiment of the processing of the source video image operator 9 (FIG. 2) for processing the subject video, according to the invention. A demultiplexer 13 receives the delayed source video image signal from the delay R2 (FIG. 2) so as to transform the chrominance and luminance components which it receives into chrominance components CBS and CRS and into a luminance component YS. The demultiplexer 13 makes it possible to modify the frequency of the cues which it receives. In the exemplary embodiment, the frequency of the cues received by the demultiplexer 13 is 27 MHZ and the frequency of the chrominance components CBS and CRS and luminance component YS is output at 13.5 MHZ. However, other frequencies corresponding to other applications are conceivable.

Each chrominance component (CBS and CRS respectively) output by the demultiplexer 13 is linked via two different pathways to the two input terminals of a switch (16 and 17 respectively) whose output terminal is linked to a multiplexer 18. In one of these two pathways for each chrominance component (CBS and CRS respectively) is an addition circuit (14 and 15 respectively) which add to the chrominance component the respective correction chrominance component (cbc and crc respectively) so as to render the chrominance component output by the addition circuit substantially achromic. The second pathway links each chrominance component directly to the second input terminal of each switch.

The two switches 16 and 17 each possess an output and are controlled by the signal DZ output by the detection of regions operator 12. When the cue output by the operator 12 indicates that the pixel to be processed belongs to the transition region, the switch has its output linked to the input terminal which gathers the corrected chrominance component.

When the cue output by the operator 12 indicates that the pixel to be processed is not in the transition region, the switch has its output linked to the input terminal which gathers the chrominance component output directly by the demultiplexer 13.

The luminance component YS output by the demultiplexer 13 is, for its part, linked directly to the multiplexer 18.

An advantage of the invention is to be able to perform or not perform a correction on each pixel depending on whether this correction proves to be necessary or unnecessary. This results in the disappearance of the heavy outline effect mentioned earlier. The rendition of the subject after overlaying is thereby very advantageously improved.

The multiplexer 18 makes it possible to modify the frequency of the cues which it receives. In the present application, the frequency of the cues received by the is multiplexer 18 is 13.5 MHZ and the frequency of the cues which it restores, these cues constituting the processed video signal VST, is 27 MHZ. As was mentioned earlier, other frequencies corresponding to other applications are however conceivable.

Figure 5:
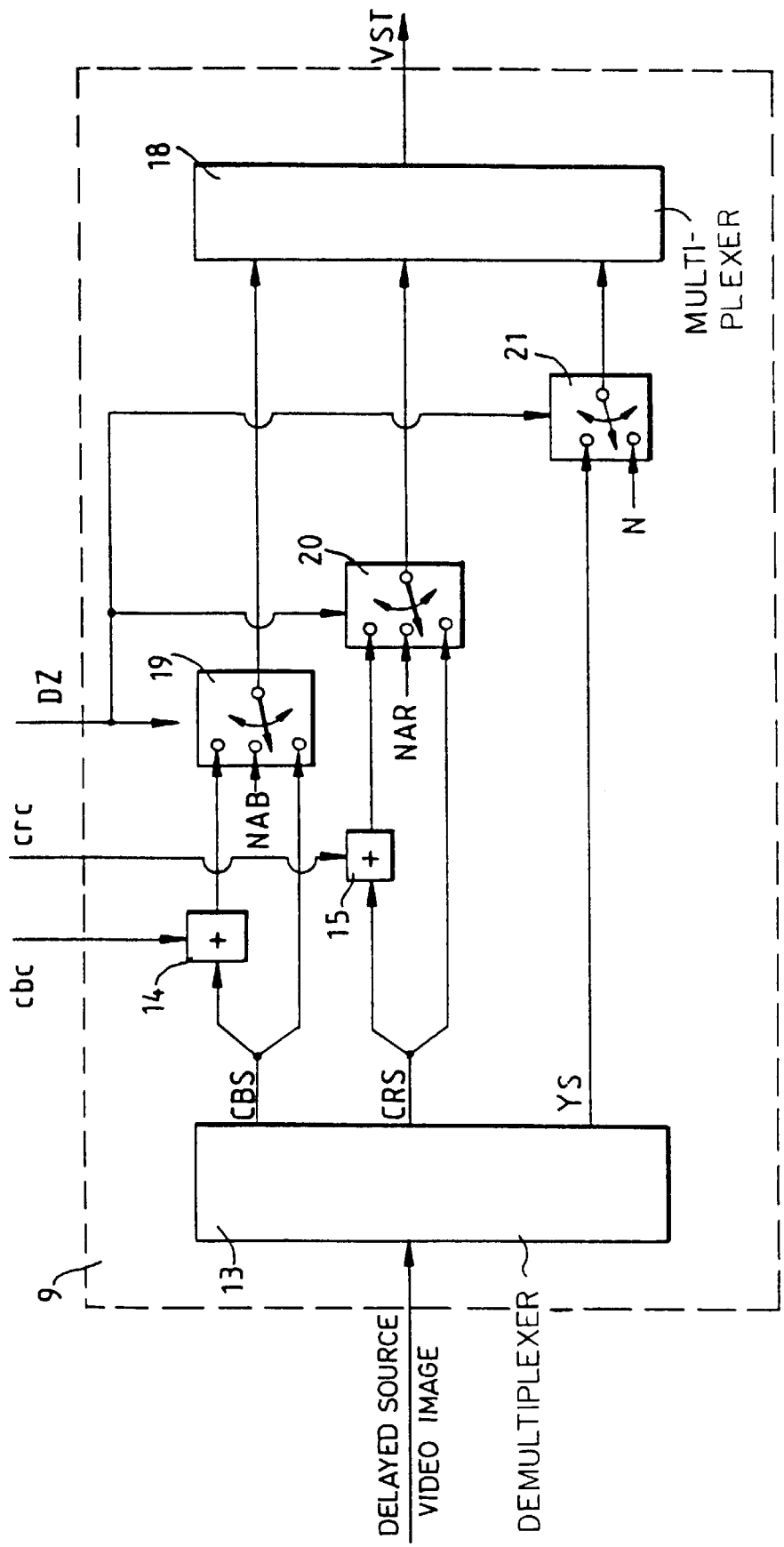
FIG. 5 is a first alternative block diagram of a detailed schematic of the "processing of the source video image" element of FIG. 2.

FIG. 5 represents a second embodiment of the processing of the source video image operator 9, according to the present invention.

According to this embodiment, the switches 16 and 17 of FIG. 4 are replaced by respective switches 19 and 20, each having three input terminals and one output linked to the multiplexer 18. Of these three input terminals, two terminals are identical to those relating to the switches 16 and 17 and are therefore linked respectively to the corrected and uncorrected chrominance components. However, the third input terminal is connected, to an achromic level; the blue achromic level "NAB" in the case of the switch 19 and the red achromic level "NAR" in the case of the switch 20.

As far as the luminance component YS is concerned, it is linked, according to this embodiment, to the first input terminal of a switch 21 whose second input terminal is linked to the luminance black level "N" and whose output terminal is linked to the multiplexer 18. All the other elements making up the operator for processing the subject video according to the second embodiment of FIG. 5 are identical to those of FIG. 4.

Figure 6:
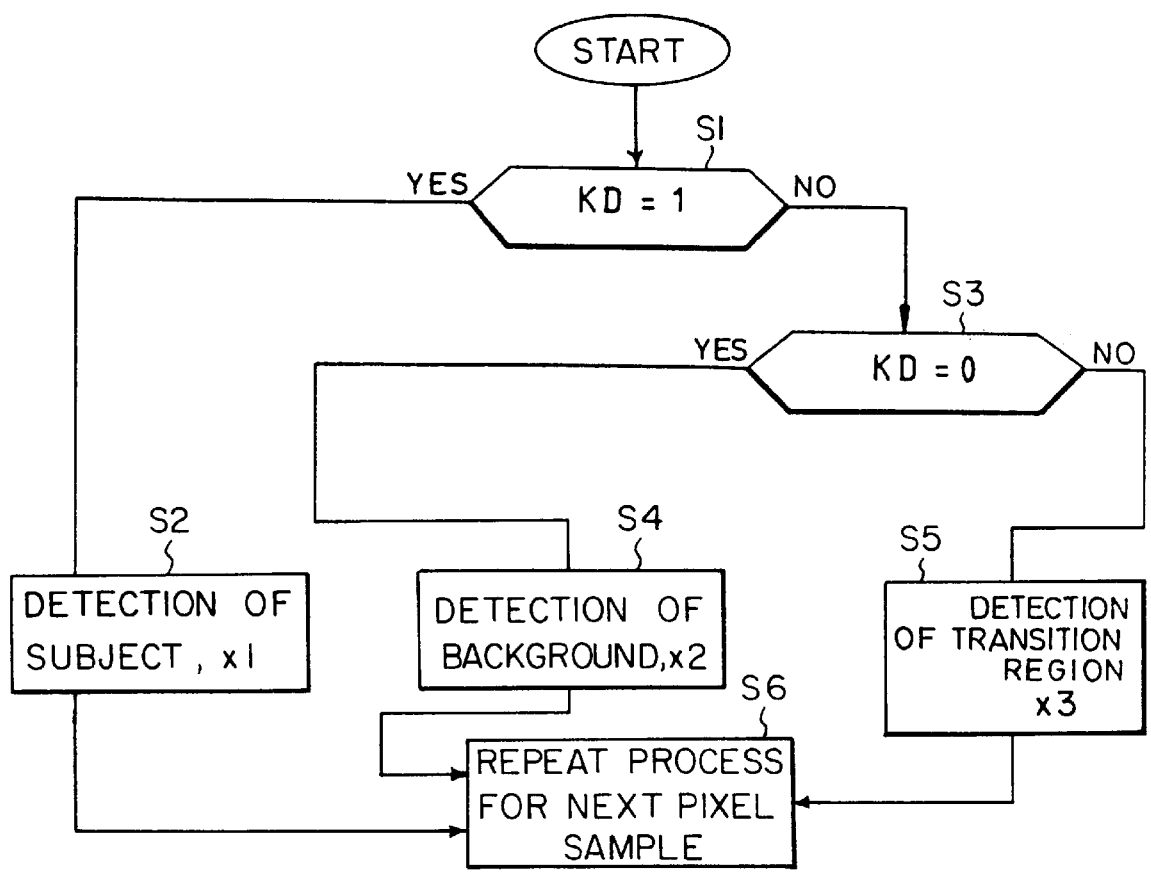
FIG. 6 is a second alternative block diagram of a detailed schematic of the "processing of the source video image" element of FIG. 2.

The switches 19, 20 and 21 are controlled by the signal DZ output by the detection of regions operator 12, the flowchart of which is described in FIG. 6.

According to this embodiment, the signal DZ supplies all the cues making it possible to locate the pixels of the subject video according to their position in the color space.

When the signal DZ takes a value signifying the detection of the subject, the switches 19, 20 and 21 link the various components CBS, CRS and YS directly to the inputs of the multiplexer 18. When the signal DZ takes a value signifying the detection of the background, the outputs of the switches 19, 20 and 21 are linked to the respective input terminals NAB, NAR and N. Finally, when the signal DZ takes a value signifying the detection of the transition region, the outputs of the switches 19 and 20 are linked to the input terminals to which the corrected chrominance components are applied and the output of the switch 21 is linked to the input terminal which receives the luminance component YS.

FIG. 6 represents the flowchart of the region detection operator. As is apparent in FIG. 2, the detection of regions operator 12 is controlled by the value of the key KD provided from the calculation of the clipping key 2. The process begins in step S1 where an inquiry is made regarding whether the key KD has the value 1. If it does, the process proceeds to step S2 where the cue DZ takes a value x1 signifying the subject has been detected, and then the process flows to step S6 where the process is repeated for a next pixel sample. If the response to the inquiry in step S1 is negative, the process proceeds to step S3.

In step S3 an inquiry is made regarding whether the key KD has a value 0. If it does, the process flows to step S3 where the cue DZ takes on a value x2 signifying the background has been detected, and the process flows to step S6. However, if the response to the inquiry in step S3 is negative, the cue DZ takes on a value x3 signifying the detection of the transition region between background and subject, and the process flows to step S6.

Figure 7:
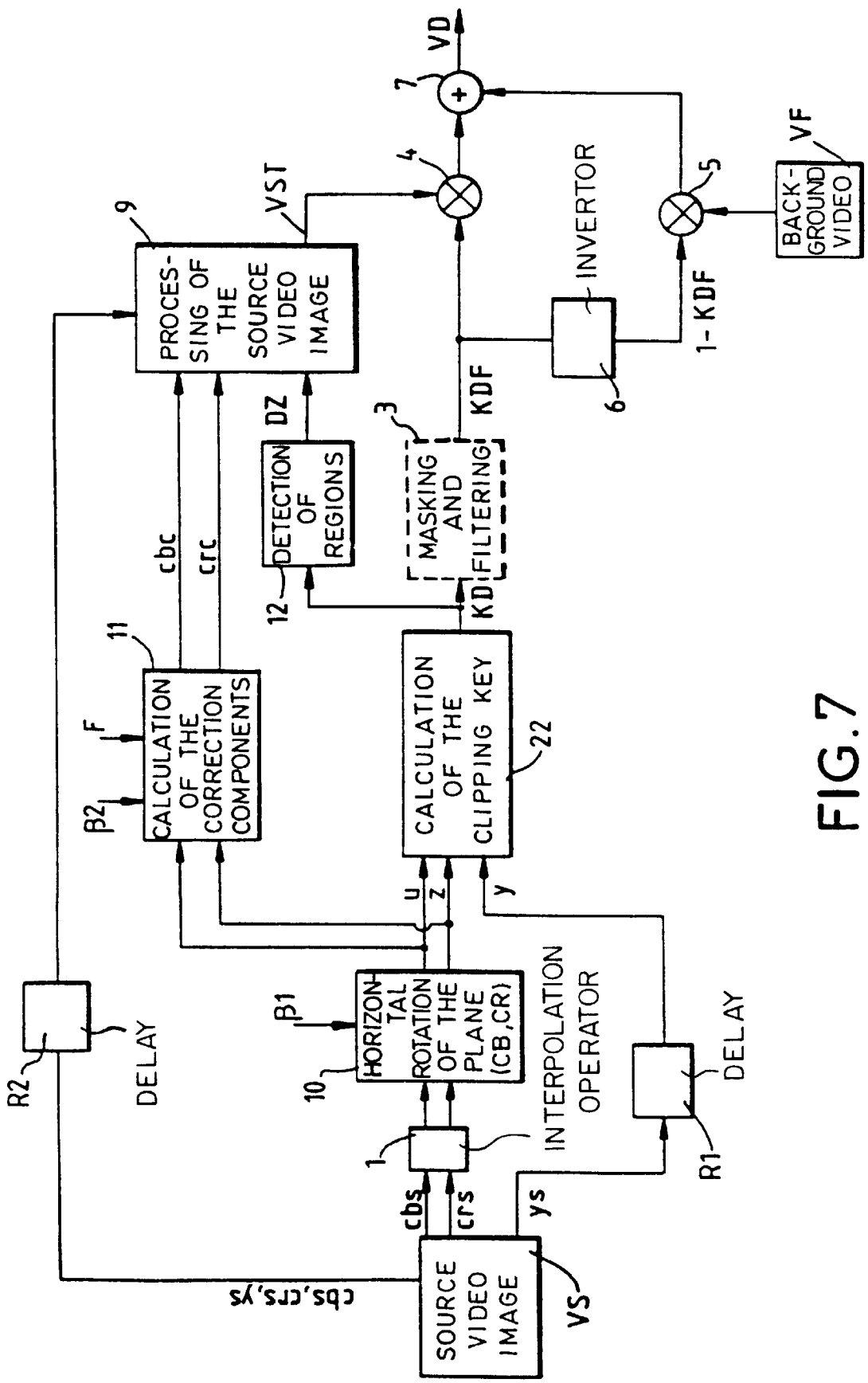
FIG. 7 is a block diagram of exemplary device of the device shown in FIG. 2.

FIG. 7 is a block diagram of a device that obtains an overlaid video image representing a subject against a new background according to another particular example embodiment of the present invention.

This example corresponds to the case in which a calculation of the clipping key operator 22 is performed on the basis of the three components u, z, y.

In the diagram of FIG. 7, all the operators other than the operator 22 for calculating the clipping key are identical to the operators represented in FIG. 2.

As has already been mentioned, it is necessary to define in the color space a volume representing the first colored background so as to be able to extract the subject from the first colored background.

The operator 22 for calculates the clipping key corresponding to a new volume approach of the first colored background so as to best incorporate the details of the subject.

Figure 8:
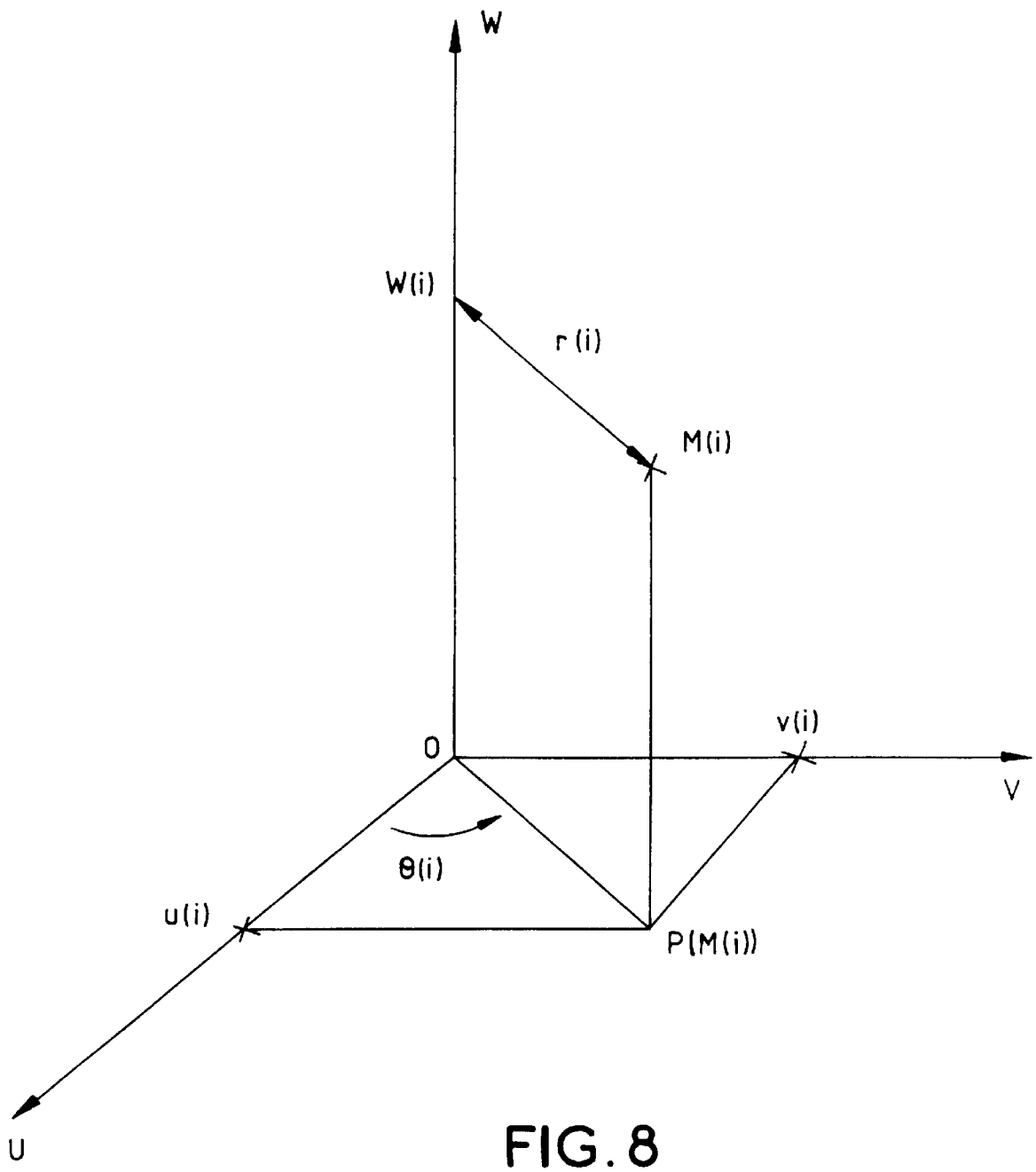
FIG. 8 is a three-dimensional graph representing a pixel in a color space in a new reference frame allowing a volume approximation of the first colored background according to the particular exemplary device of FIG. 7.

FIG. 8 represents a pixel in the color space in the new reference frame (U, V, W) allowing the volume approach of the first colored background, according to the particular example embodiment of the invention.

The new reference frame (U, V, W) arises from a rotation of angle γ of the plane (Z, Y) around the axis U. The angle of rotation γ is such that the axis Y becomes the axis W which points in the direction of a color pixel of the first colored background and the axis Z becomes the axis V perpendicular to the axis W such that the trihedral (U, V, W) is a right-handed trihedral.

This change of frame of reference can be expressed in matrix form by the relation:

$$\begin{pmatrix} w \\ v \end{pmatrix} = \begin{pmatrix} \cos(\gamma)\sin(\gamma) \\ \sin(\gamma) - \cos(\gamma) \end{pmatrix} \begin{pmatrix} z \\ y \end{pmatrix}$$

The pixel M(i) represented in FIG. 8 has a component along each of the three axes U, V, W (i.e. the components u(i), v(i), w(i) respectively).

The cylindrical coordinates of the point M(i) in the frame of reference (U, V, W) are: r(i), θ(i) and w(i). It follows that:

$$r(i) = \sqrt{u(i)^2 + v(i)^2}$$

and $$\theta(i) = (\vec{U}, \vec{O}P(Mi))$$

where the point P(Mi) is the projection of the point M(i) onto the plane (U, V).

In the remainder of the description, the distance r(i) will be referred to as the chrominance distance of the point M(i) with respect to the axis W.

Figure 9:
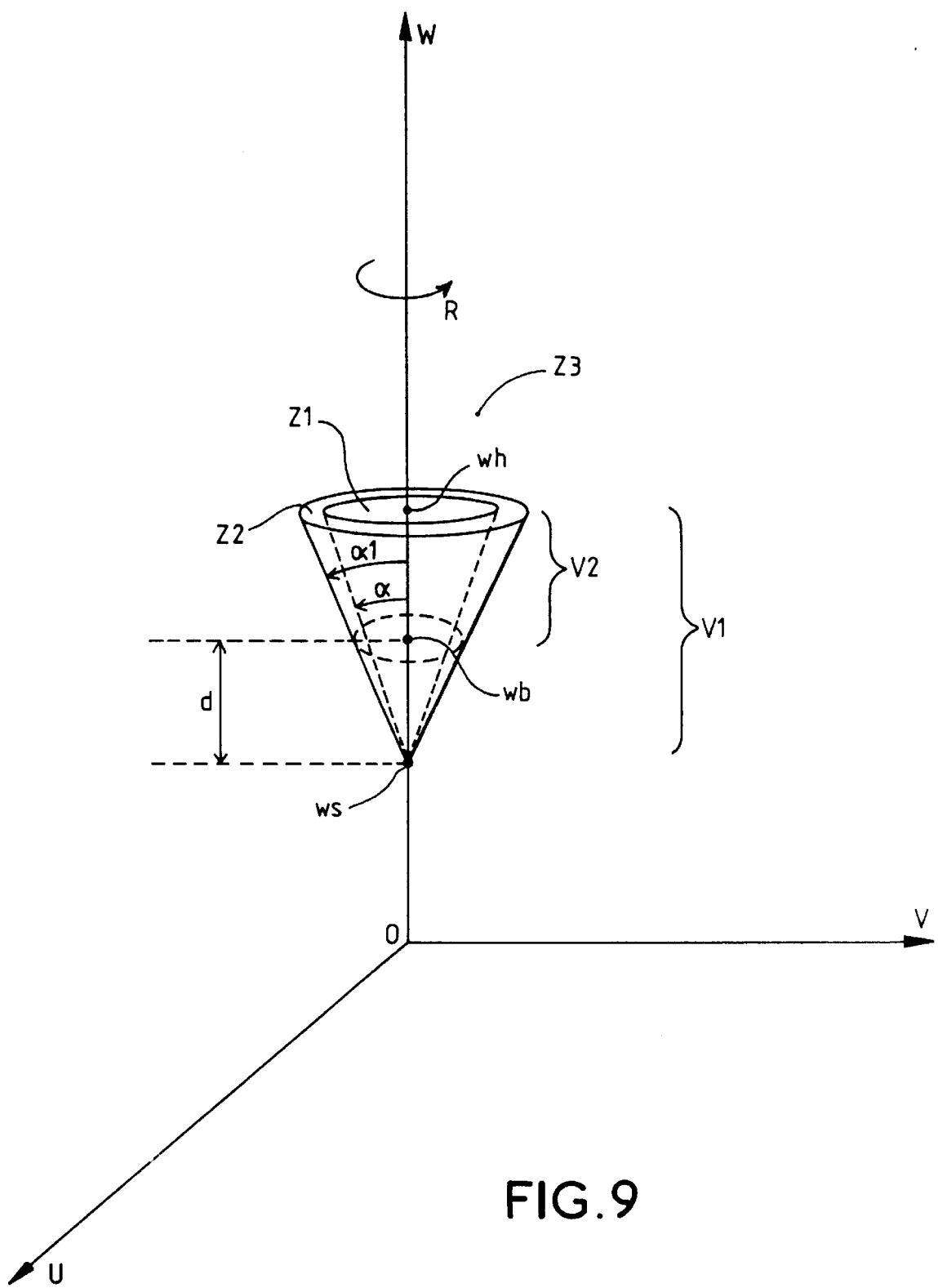
FIG. 9 is a three-dimensional graph that represents the volume of the first colored background according to the volume approximation of FIG. 8.

FIG. 9 represents the volume approximation of the first colored background according to the example of FIG. 7.

The volume which represents the first colored background has the shape of a complete cone (with a volume V1) or truncated cone (with a volume V2) in the color space referenced with respect to the new frame of reference (U, V, W) deduced from the frame of reference (CB, CR, Y) via the geometrical transformations described earlier. The color space is divided into three regions: region Z1 which represents the colored background, region Z3 which represents the subject and region Z2 which represents the transition between the subject and the colored background.

The cone representing the first colored background is defined by an angular aperture α, a vertex situated at the abscissa ws on the axis W, and an elliptical or circular cross-section. A high luminance threshold, of abscissa wh greater than ws on the axis W, makes it possible to define the face opposite the vertex of the cone. A low luminance threshold, of abscissa wb situated between ws and wh on the axis W, makes it possible to define the truncated face situated at the distance d from the vertex with abscissa ws. The abscissa wb can coincide with the abscissa ws. According to the invention, the cone can turn through an angle R varying from 0 to π about the axis W.

The transition region Z2 is defined by the space included between the surface of the cone of aperture α and the surface of a cone of aperture α1 greater than α, with the same axis of symmetry and the same vertex as the cone of aperture α and whose face opposite the vertex of the cone is in the same plane as the face opposite the vertex of the cone of aperture α.

The region Z3 representing the subject is defined by the space situated beyond the cone of aperture α1.

Figure 10:
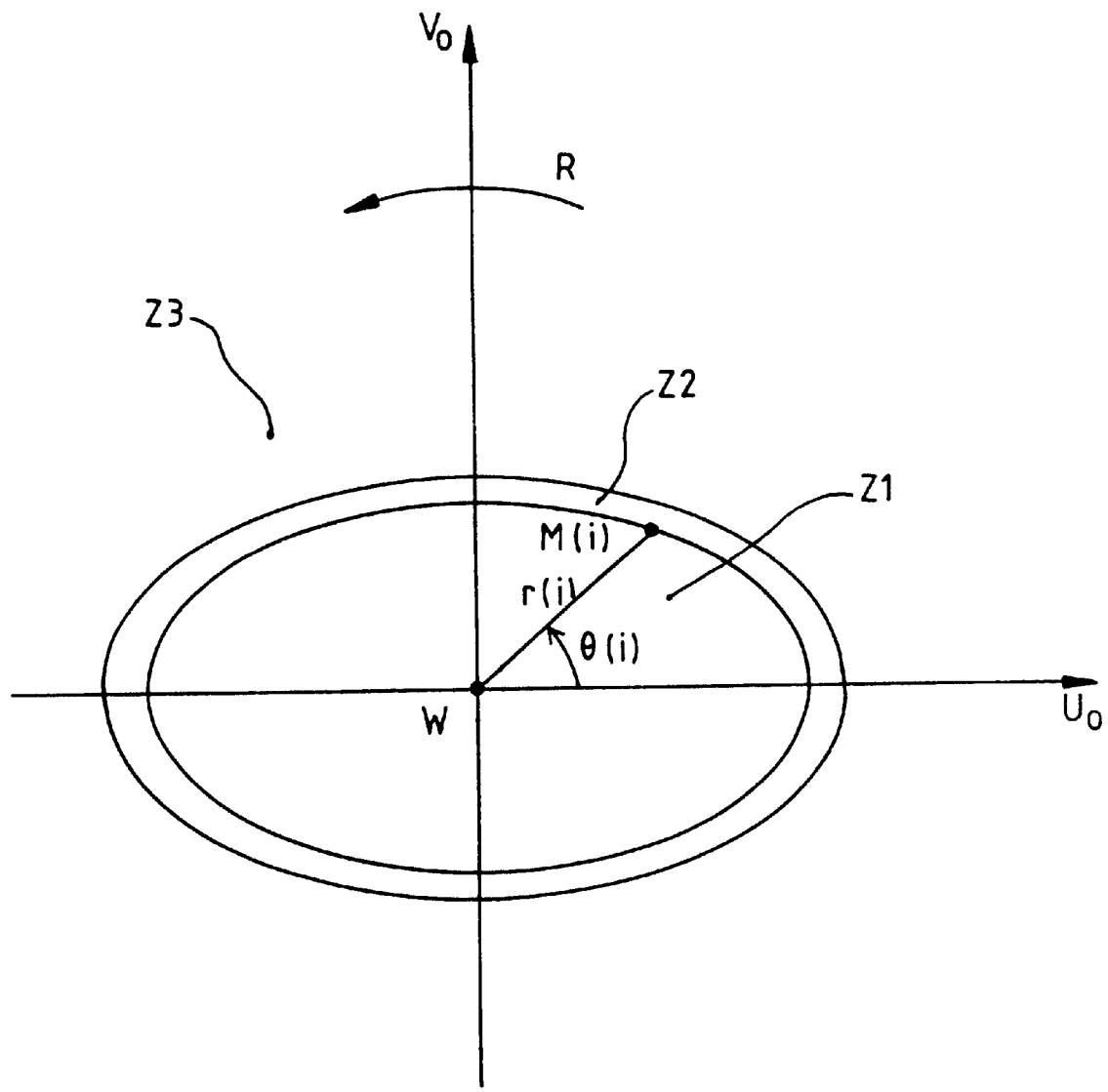
FIG. 10 is a two-dimensional graph that represents a sectioned view of the volume of the first colored background through a plane perpendicular to a first axis of the new reference frame.

FIG. 10 represents the sectioned view of the volume of the first colored background through a cross-sectional plane (Uo, Vo) of the cone. This sectioned view shows an elliptical section. This elliptical section is capable of turning about the axis W through an angle R as mentioned above. The coordinates r(i) and θ(i) of each pixel M(i) delimiting the colored background are then linked by the equation:

$$k^2 r(i)^2 \cos^2(\theta(i)+R) + r(i)^2 \sin^2(\theta(i)+R) = \text{constant}.$$

Modulation of the parameter k allows distortion of the ellipse. According to the invention, the elliptical modulation of the chrominance distance allows for the possibility of producing a circle in the case in which k=1. Preferentially, k varies between 0 and 2. The value of R can vary from 0 to π. Advantageously, this modulation technique makes it possible to increase the selectivity of the volume defining the colored background. By way of example, the technique of elliptical modulation associated with the rotation R allows a sharp improvement in respect of reproducing the transparency of eye glasses.

Figure 11:
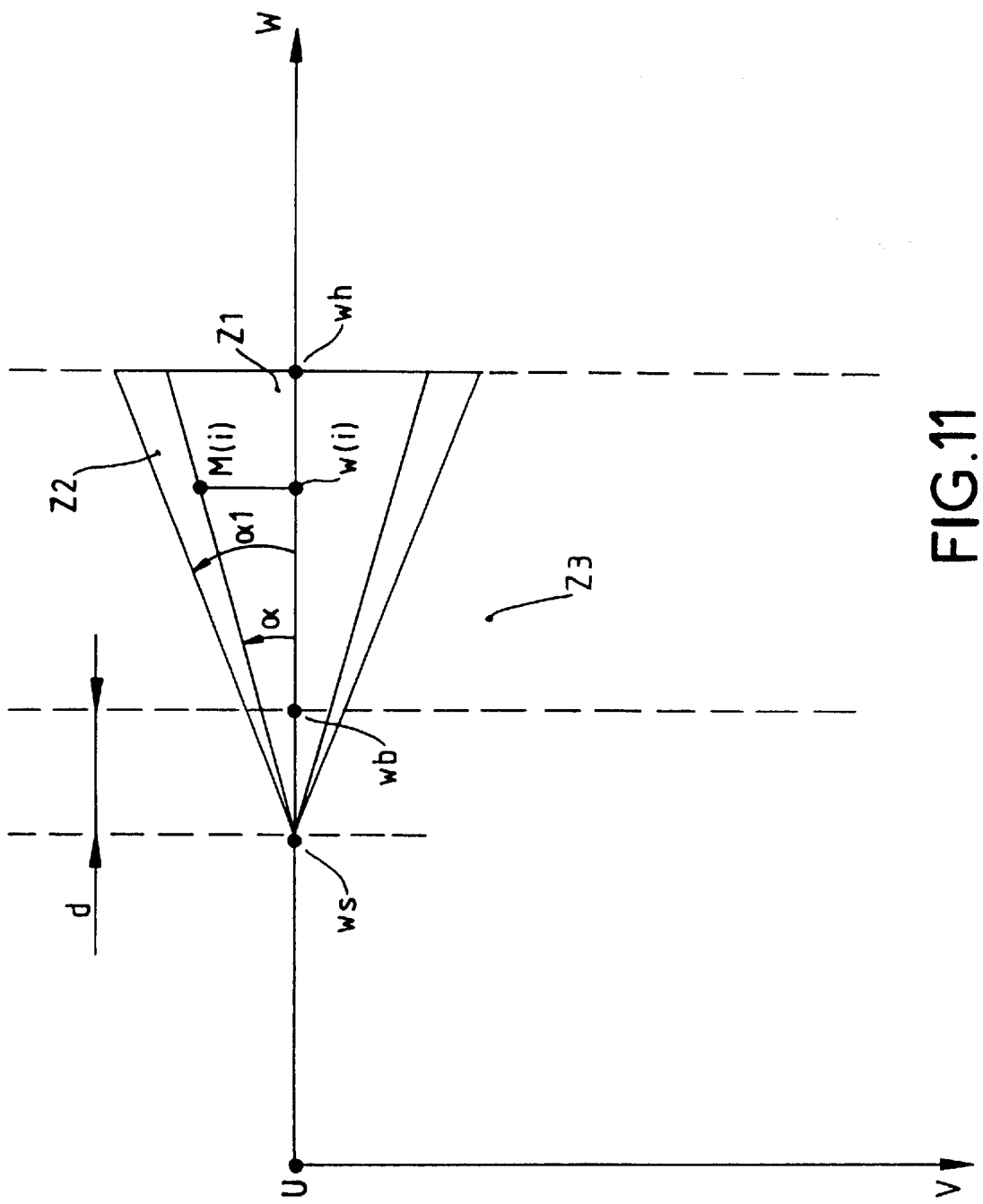
FIG. 11 is a two-dimensional graph that represents the sectioned view of the volume of the first colored background through a plane perpendicular to a second axis of the new reference frame.

FIG. 11 represents the sectioned view of the volume of the first colored background through a plane passing through the major axis of the ellipse and the vertex of the cone. The conical volume is defined in such a way that the elliptically modulated chrominance distance, denoted $r_e(i)$, the angle of aperture α of the cone and the coordinate w(i) of the point whose chrominance distance is $r_e(i)$ are linked by the equation:

$$r_e(i) - \alpha w(i) = \text{CLIP}$$

where CLIP is a parameter whose variation makes it possible to bring about the displacement of the ordinate ws of the vertex of the cone on the axis W. By way of example, the range of variation of the angle α is between 0 and 45°. The conjugate action of the parameters α and CLIP advantageously allows modulation of the definition of the colored background, and therefore of the subject to be processed. For a zero thresholding value ws, the whole of the clipped volume drops to the black plane.

The variation in the abscissa ws makes it possible to incorporate, into the volume which defines the colored background, points of greater or lesser luminance having the hue of the colored background. Advantageously, it is then possible to take into account nonuniform colored backgrounds whose luminace varies to the eye in a not insignificant manner. As was mentioned earlier (in reference to FIG. 9), the cone can be truncated at a distance d in the case in which wb is different from ws.

The parameter CLIP makes it possible to calculate the chrominance key KC. Any point of the image whose chrominance distance is less than the value CLIP belongs to the colored background 1 and possesses a zero chrominance key KC.

The transition region Z2 is associated with the thresholding of the chrominance distance and allows for gradual transfer between the background and the subject. The size of the transition region can be altered via an adjustment parameter termed GAIN. For this purpose, the parameter GAIN makes it possible to calculate the distance separating the points belonging to the cone of aperture α1 from those belonging to the cone of aperture α. Any image point situated in region Z3, beyond the transition region Z2, belongs to the subject and has a chrominance key value KC equal to 1.

All the points with abscissa w(i) less than wb have a luminance key KL equal to 1. All the points with abscissa w(i) greater than wh have a luminance key KL equal to 0. All the points with abscissa w(i) situated between wb and wh are within the luminance-transition region.

The generation of the clipping key KD for the first colored background is carried out by virtue of the combining of the chrominance key KC and the luminance key KL. Thus, for each of the points of the image, calculation of the maximum of the two keys allows the construction of the volume defining the colored background; it follows that:

$$KD = MAX [KC, KL].$$

Figure 12:
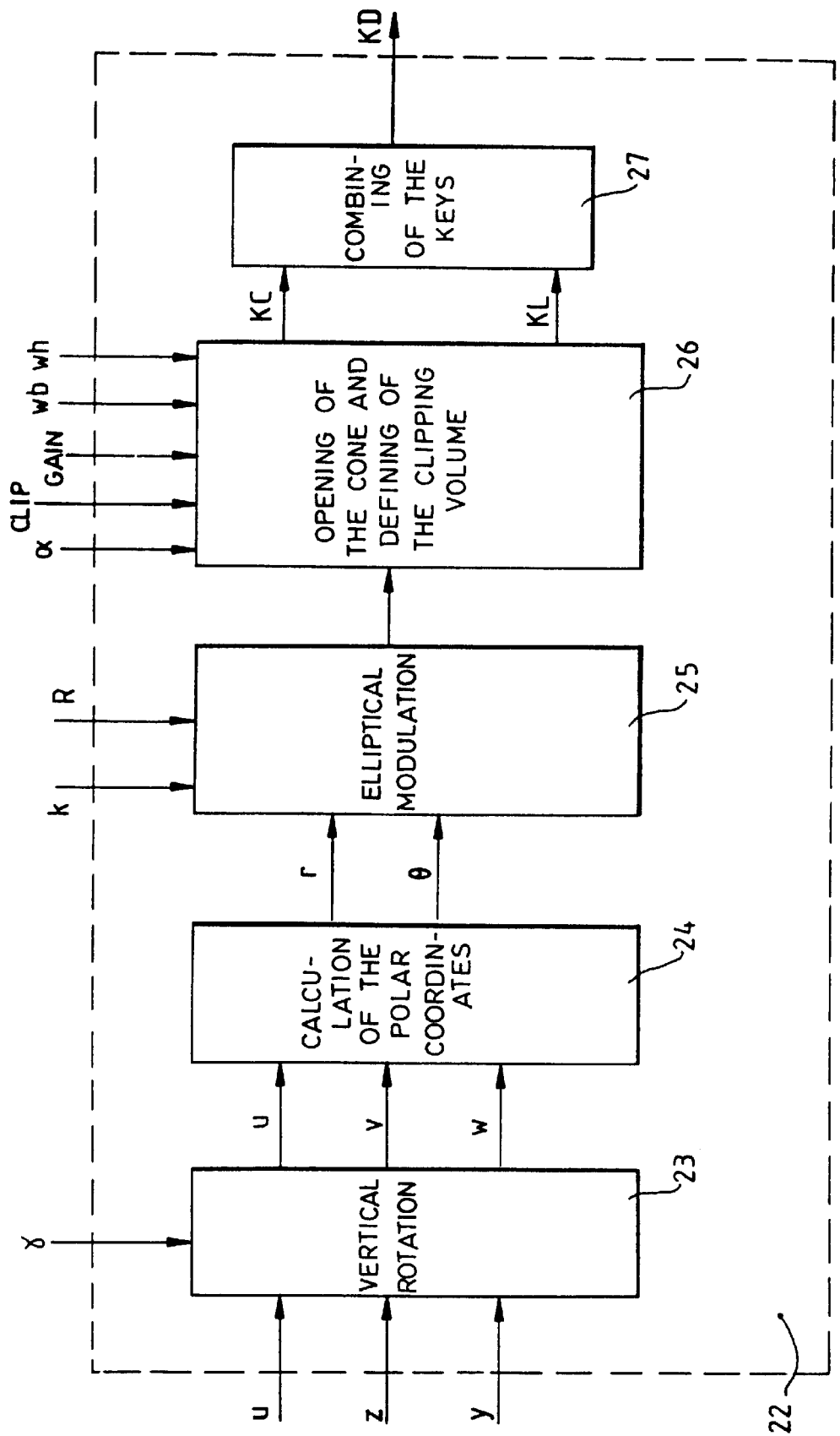
FIG. 12 is a block diagram of a detailed schematic of the "calculation of the clipping key" element of the exemplary embodiment of FIG. 7.

FIG. 12 is a detailed block diagram for the calculation of the clipping key operator 22. The components u, z, y of each pixel M(i) are transformed into components u, v, w by the previously defined vertical rotation 23 of angle αy.

In a first stage, a control microprocessor (not shown, but understood to pass data and control signals amongst the components of the devices of FIGS. 2–5, 7, 11 and 13 via a bus) loads the cues sin (γ) and cos (γ) during field blanking while a multiplier calculates the products z×cos (γ), z×sin (γ), y×cos (γ) and y×sin (γ) during the active field. The cues z, y are provided at the frequency of 13.5 MHZ. The cues cos (γ), sin (γ) are provided at the frequency of 27 MHZ. It follows that at the output of the multiplier, the cues are multiplexed at the frequency of 27 MHZ.

In a second stage, the cues multiplexed at the frequency of 27 MHZ, are demultiplexed and matrixed to obtain the signals w and v at the frequency of 13.5 MHZ.

During the vertical rotation operator 23, the signal w is delayed in such a way as to compensate for the processing time required for a calculation of the polar coordinates (r, θ) operator 24.

The coordinates r and θ associated with each pixel are given by the formulae:

$$r = \sqrt{u^2 + v^2}$$

The coordinates r and θ are retrieved at the output of the operator 24 so as to carry out the elliptical modulation in the elliptical modulation operator 25.

The elliptical modulation 25 is preferably carried out by calculating a modulating factor A. The factor A is calculated for each pixel, for the duration of field blanking, with the aid of two adjustment parameters k and R such as those mentioned while describing FIG. 10; it follows that:

$$A = \sqrt{k^2 \cos^2(\theta + R) + \sin^2(\theta + R)}$$

The factor k allows elliptical distortion of the chrominance distance r and the angle R allows rotation of the elliptical section of the cone from 0 to π.

The elliptically modulated chrominance distance may then be written:

$$r_e = r(A)^{1/2}.$$

The calculation of A is performed, for example, with the aid of an EPROM memory hard-wired for this purpose (or another suitable calculating and memory device). The dynamics of multiplying of r by $(A)^{1/2}$ takes place over N bits, for example 16 bits, at the frequency of sampling of the luminance components, i.e., 13.5 MHz.

The elliptical modulation operator 25 is followed by an opening of the cone and defining of the clipping volume operator 26 that operates with the aid of the parameters α, CLIP, GAIN, wb and wh.

The conical aperture angle α as well as the chrominance distance threshold value CLIP are applied to the values $r_e$ and w of each pixel according to the law stated earlier, i.e.:

$$r_e - \alpha w = \text{CLIP}.$$

The parameter GAIN makes it possible to define the size of the transition region between the first colored background and the subject as mentioned previously.

Similarly, the parameters wb and wh, the low luminance threshold and the high luminance threshold respectively, allow delimitation of the volume of the first colored background along the axis W.

Thus, an advantage of this volume approach is the easily adaptable nature of the volume defining the first colored background.

The defining of the clipping volume allows the generation of the chrominance key KC and the luminance key KL such as mentioned above.

The keys KC and KL arising from the operation 26 defining the clipping volume are then combined via a combining operation 27 so as to obtain the key KD allowing the clipping of the volume defining the first colored background. As was mentioned earlier, it follows that:

$$KD = MAX [KC, KL].$$

The pixels for which KD=1 belong to the subject and those for which KD=0 belong to the first colored background. For the pixels of the transition region, KD is between 0 and 1.

Figure 13:
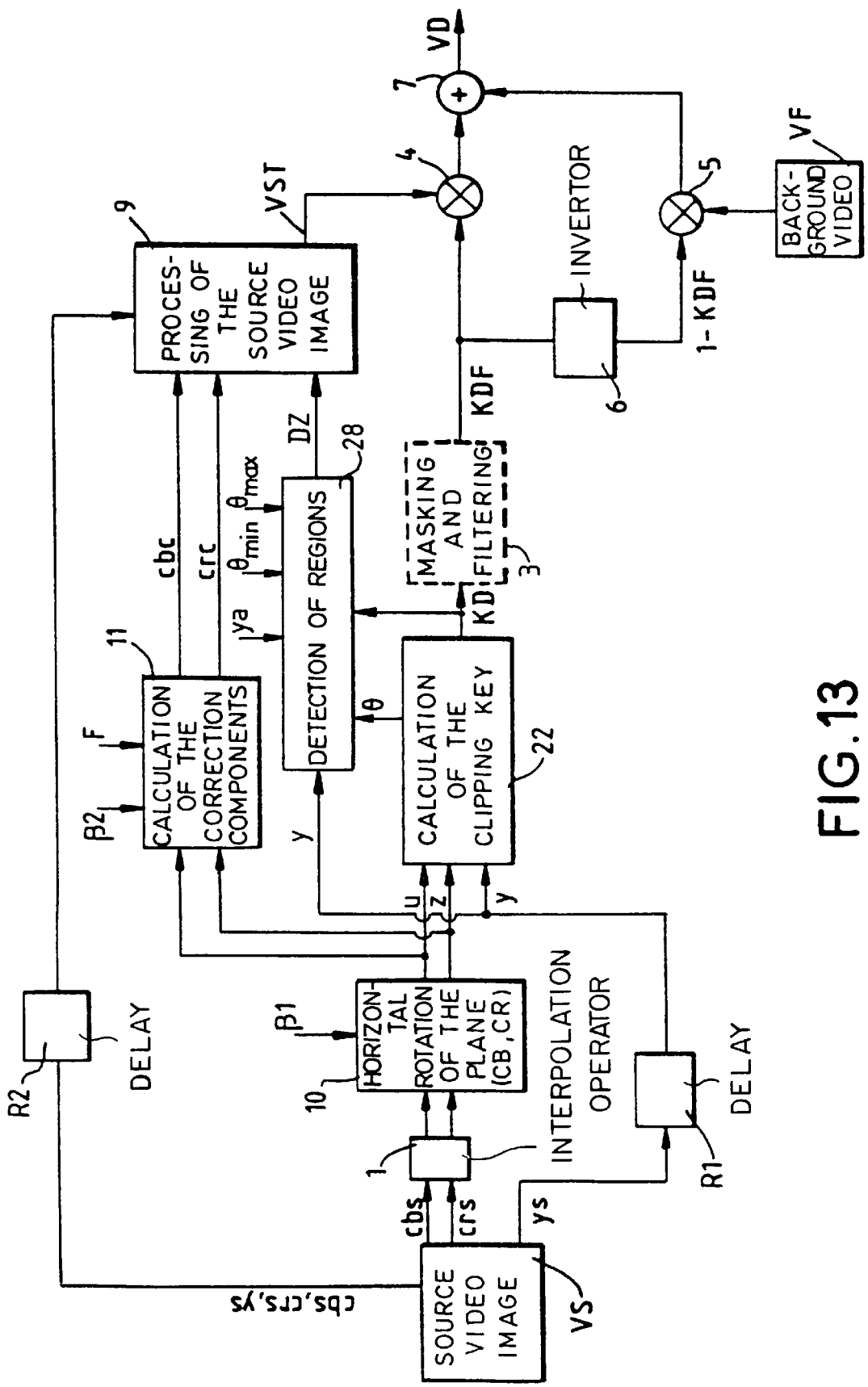
FIG. 13 is a block diagram representing an enhancement embodiment as compared to the embodiment of FIG. 7.

FIG. 13 represents an enhancement to the device shown in FIG. 12. This enhancement relates to detecting of a shadow cast by the subject on the first colored background.

The shadow cast is characterized by a luminance cue which is less than the mean luminance level of the first colored background and has the same hue as that of the first colored background.

According to this enhancement, the shadow cast can be blanked out or restored by attenuating the luminance of the new receiving background. In respect of the cue which allows clipping, the shadow is not part of the first colored background. It must however be distinguished from the subject. For this purpose, any pixel situated around the hue of the first colored background, whose luminance value is less than a certain threshold and which belongs to the transition region Z2 situated between the colored background 1 and the subject 3, is regarded as a shadow pixel.

Advantageously, the orientation and conical shape of the volume defining the first colored background enable the shadow pixels to be entered into the transition region Z2 separating the subject from the first colored background.

According to the enhancement of FIG. 13, a detection of regions operator 28 includes features that permit the detection of the shadow cast by the subject on the first colored background. The luminance component y is compared with a luminance threshold value ya, and the angular coordinate θ output by the operator 24 (FIG. 12) is compared with two values θmin and θmax whose difference θmax−θmin defines the angular aperture within which the angle θ must lie in order for the hue of the pixel associated with θ to be likened to the hue of the first colored background. Any pixel whose value of θ is between θmin and θmax and whose luminance value y is less than ya is regarded as a shadow pixel.

As mentioned earlier, the shadow pixels are situated in the transition region Z2 separating the subject from the first colored background. Thus, the key KD is applied to the region detection operator 28 so as to furnish the cue making it possible to locate the pixels of the transition region Z2. The signal DZ output by the region detection operator 28 then makes it possible to provide a cue for detecting shadow pixels according to the process mentioned above.

Figure 14:
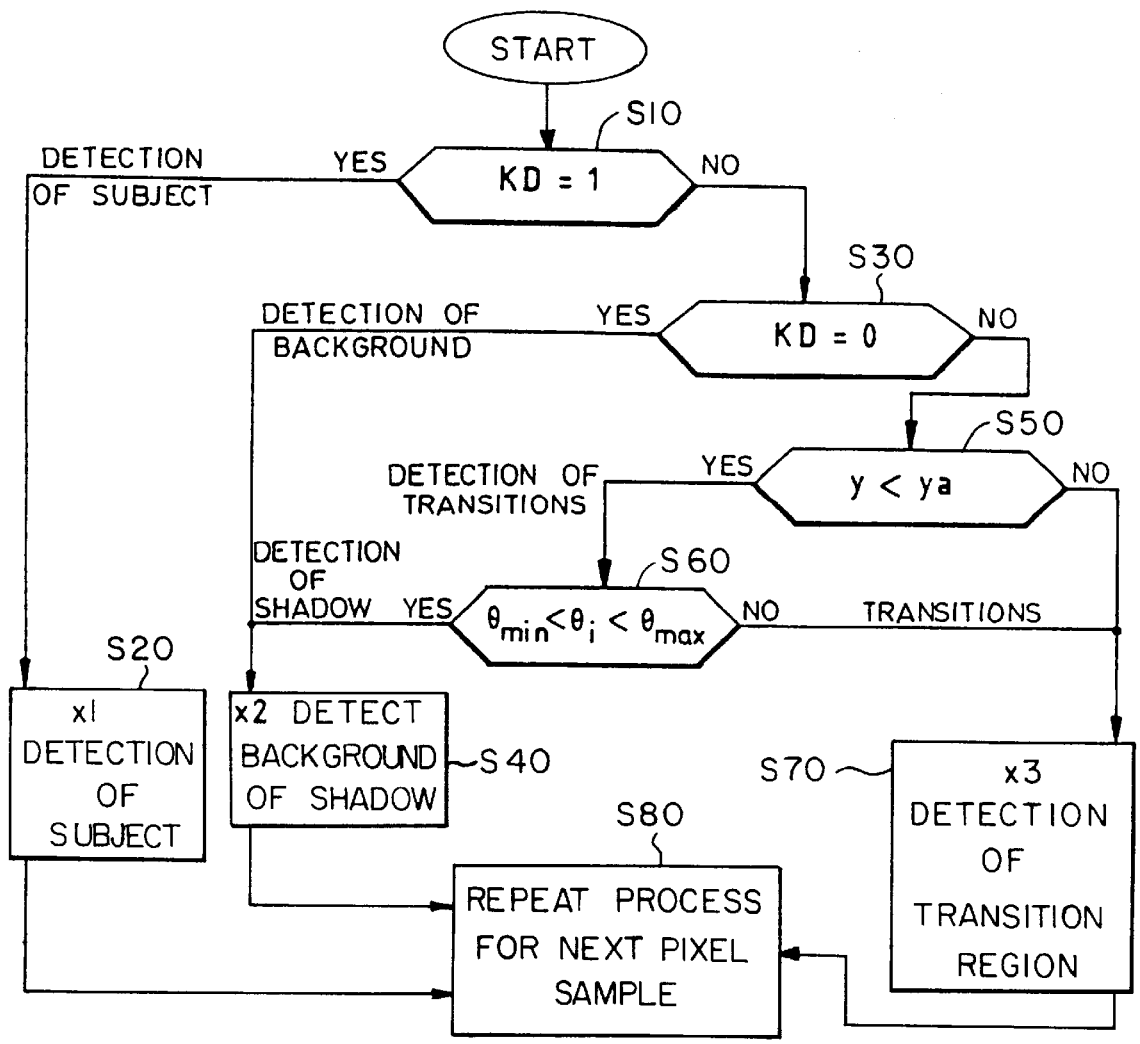
FIG. 14 is a flowchart describing a process flow performed in the "detection of regions" block of FIG. 13.

Advantageously, as is apparent in FIG. 14, the signal DZ can supply not only a cue for locating the shadow pixels but also various cues making it possible to locate the pixels representing the source video image according to their position in the color space.

Represented in FIG. 14 are the various steps of the region detection operation 28 in the form of a flowchart in the case in which the signal DZ supplies all the cues making it possible to locate the pixels representing the source video image according to their position in the color space. However, the invention relates also to the cases in which DZ provides all or some of these cues.

The process starts in step S10 where an inquiry is made regarding whether the key KD has the value 1. If the response is affirmative, the process proceeds to step S20 where the cue DZ takes a value x1 signifying the detection of the subject, and then the process flows to step S80 where the process is repeated for the next pixel sample. If the response to the inquiry in step S10 is negative, the process flows to step S30.

In step S30 an inquiry is made regarding whether KD equals zero. If the response is affirmative, the process flows to step S40 where the cue DZ takes on a value x2 signifying the detection of the background, and then the process proceeds to step S80. However, if the response to the inquiry in step S30 is negative, the process flows to step S50.

In step S50 an inquiry is made regarding whether the luminance value y is less than the threshold value ya. If the response is negative the cue DZ takes a value x3 signifying the detection of the transition region between background and subject, and then the process flows to step S80. However, if the inquiry to step S50 is positive, the process flows to step S60.

In step S60 an inquiry is made regarding θ is between θmin and θmax. If the response is affirmative, the process flows to step S40 where the cue DZ takes a value signifying the detection of the shadow. Preferably, this value is equal to x2 so that the shadow pixels are processed like the pixels of the background. However, if the response to the inquiry in step S60 is affirmative, the process flows to step S70 indicating the cue DZ takes a value signifying the detection of the transition region between background and subject.

The present invention may also be implemented by the preparation of ASICs, FPGAs, or by interconnecting an appropriate network of conventional component circuits, as is described herein, modifications of which will be readily apparent to those skilled in the art(s).

The present invention thus also includes a computer product which may be a storage medium including instructions which can be used to program a computer to perform a process in accordance with the present invention. The storage medium can include, but is not limited to, any type of disk including floppy disk, optical disk, CD-ROMs, and magneto-optical disks, ROMs, RAMs, EPROMs, EEPROMs, Flash memory, magnetic or optical cards, or any type of media suitable for storing electronic instructions.

Obviously numerous modifications and variations of the present invention are possible in light of the above teachings. It is therefore to be understood that within the scope of the appended claims, the invention may be practiced otherwise than specifically described herein.

What is claimed as new and desired to be secured by Letters Patent of the United States is:

1. A method of overlaying a subject clipped from a first colored background of a source video image onto a second colored background of a final video image comprising the steps of:
   calculating a clipping key;
   separating a color-luminance space of the source video image into three regions based on the clipping key, comprising the steps of,
   defining as a first region a first volume indicative of the first colored background,
   defining as a second region a second volume indicative of the subject, and
   defining as a third region a transition region between the first colored background and the subject;
   forming a subject video comprising the steps of,
   detecting into which of said three regions a pixel from the source video image is located, and
   decolorizing the pixel if the pixel is located in the third region; and
   forming the final video image comprising the step of mixing the clipping key, KD, with the subject video and a background video which is a video image of the second colored background, according to a formula $VD=KD \times \text{subject video} + (1-KD) \times \text{background video}$.

2. The method according to claim 1, wherein said decolorizing step comprises the steps of:
   identifying at least one of a blue color difference chrominance component and a red color difference chrominance component; and
   applying at least one of the blue color chrominance component and the red color chrominance component to the pixel if the pixel is located in the third region so as to render the pixel substantially achromic.

3. The method according to claim 2, wherein the identifying step comprises identifying the at least one of a blue color difference chrominance component and a red color difference chrominance component based on a decolorization key, KA.

4. The method according to claim 3, wherein said identifying step comprises identifying respective values of the correction blue color chrominance component and the correction red color chrominance component respectively by multiplying a quantity cos (β2) with the decolorization key KA and multiplying a quantity sin (β2) with the decolorization key KA, where β2 equals β1+π, and β1 is an angle of transformation that transforms a red color chrominance axis of the color-luminance space into a Z axis that points in a direction of hue for a pixel of the first colored background.

5. The method according to claim 3, wherein said decolorizing step comprises the step of calculating the decolorization key, KA, according to a formula, $KA = z - F \, |u|$, where z and u are respective coordinates of pixels along the Z axis and a U axis, where the U axis arises from a rotation by an angle β1 of a blue color chrominance axis, CB, of the color-luminance space, |u| denoting an absolute value of the coordinate u, and F being an adjustment parameter.

6. A method according to claim 1, wherein the step of forming a subject video comprises the step of setting the pixel to black if the pixel is located in the first colored region corresponding to the first colored background.

7. A method according to any one of claim 1, wherein the separating step comprises the step of defining the first volume as a cone of aperture angle α whose axis of symmetry /W/ passes through an achromic and zero-luminance point of the color-luminance space and another point representing a color of the first colored background.

8. A method according to claim 7, wherein the step of defining the first volume comprises defining the first volume as a cone such that polar coordinates r(i) and θ(i) of plural pixels /Mi/ that define a cross-section of the cone in a plane (Uo, Vo) such that a trihedral (Uo, Vo, W) is a right-handed trihedral, that obey an equation, $k^2 r(i)^2 \cos^2(\theta(i)+R) + r(i)^2 \sin^2(\theta(i)+R) = \text{constant}$, where θ(i) is a polar angle defining a point M(i) in the plane (Uo, Vo), k an elliptical modulation factor for a coordinate r(i), and R being an angle of rotation of the cross-section of the cone.

9. The method according to claim 8, wherein the defining the first volume step comprises relating the aperture α of the cone to an adjustment parameter CLIP such that $r_e(i) - \alpha w(i) = \text{CLIP}$, where $r_e(i) = r(i) \, (A)^{1/2}$ with $A = \sqrt{k^2 \cos^2(\theta(i)+R) + \sin^2(\theta(i)+R)}$ and where w(i) is a coordinate on an axis of symmetry /W/ of the cone in the plane (Uo, Vo), a face opposite of a cone vertex being a coordinate wh on the axis of symmetry /W/ of the cone.

10. The method according to claim 8, wherein the step of defining the first volume defines the first volume with the elliptical modulation factor k restricted to a range 0≦k≦2, and the angle R variable between 0 and π.

11. The method according to claim 8, wherein the step of defining as the third region as the transition region comprises defining the transition region as being between the first colored background and the subject, and is defined by a region of space included between a surface of the cone of aperture α defining the first colored background and another cone of aperture α1 greater than α, with the same axis of symmetry and the same vertex as the cone defining the first colored background, and having another face opposite a vertex of the another cone and in the same plane as the face opposite the vertex of the cone of the first colored background.

12. The method according to claim 11, wherein said step of defining as a third region a transition region comprises changing a size of the transition region by adjusting a value of an adjustment parameter.

13. The method according to claim 7, wherein said separating step comprises truncating the cone defining the first colored background at a distance d so as to separate a low luminance threshold region between a coordinate ws that defines a position of the vertex of the cone on the axis of symmetry W and a coordinate wb defining, on the said axis of symmetry, a low luminance threshold from a high luminance threshold bounded by a coordinate wh, where wb has a value lying between ws and wh.

14. The method according to claim 13, wherein said calculating a clipping key step comprises combining a chrominance key KC and a luminance key KL according to a formula, $$KD = \text{MAX}[KC, KL],$$

the luminance key KL having a value 1 for pixels having a coordinate w(i) on the axis of symmetry W that is less than wb and a value 0 for pixels having the coordinate w(i) that is greater than wh, and the chrominance key KC having a value 0 for any pixel belonging to the cone of aperture α and the value 1 for any pixel situated beyond the cone of aperture α1.

15. The method according to claim 7, wherein the step of separating a color-luminance space comprises converting into arithmetic zeros an origin of a frame of reference for the color-luminance space which corresponds to respective achromic levels of the chrominance components and a zero level for the luminance component.

16. The method according to claim 1, wherein the step of detecting into which of said three regions a pixel from the source video is located comprises locating a shadow of said subject cast on the first colored background.

17. The method according to claim 16, wherein the step of detecting into which of said three regions a pixel from the source video is located comprises the steps of:
comparing a luminance value y of each pixel M(i) with a threshold value ya, if the clipping key KD is between 0 and 1;
assigning a value to a signal DZ signifying the pixel is located in the transition region, if the luminance value y is greater than the threshold value ya, the cue DZ;
assigning a value to the signal DZ signifying the pixel is located in the shadow if the luminance value y is less than the threshold value ya and if an angle θ(i) is between two values θmin and θmax whose difference θmax−θmin defines an angular aperture within which the angle θ(i) must lie in order for a hue of the pixel associated with θ(i) to be likened to the hue of the first colored background; and
assigning a value to the signal DZ signifying the pixel is located in the transition region if the luminance value y is less than the threshold value ya and if the angle θ(i) is not between the said values θmin and θmax.

18. The method according to claim 1, wherein said step of calculating a clipping key comprises masking and filtering the clipping key.

19. A device that overlays a subject clipped from a first colored background of a source video image onto a second colored background of a final video image comprising:
means for calculating a clipping key;
means for separating a color-luminance space of the source video image into three regions based on the clipping key, comprising defining means for defining as a first region a first volume indicative of the first colored background, defining as a second region a second volume indicative of the subject, and defining as a third region a transition region between the first colored background and the subject;
means for forming a subject video comprising,
means for detecting into which of said three regions a pixel from the source video image is located, and
means for decolorizing the pixel if the pixel is located in the third region; and
means for forming the final video image comprising,
means for mixing the clipping key, KD, with the subject video and a background video which is a video image of the second colored background, according to a formula $$VD = KD \times \text{subject video} + (1-KD) \times \text{background video}.$$

20. The device according to claim 19, wherein said decolorizing the pixel comprises:
means for identifying at least one of a blue color difference chrominance component and a red color difference chrominance component; and
means for applying at least one of the blue color chrominance component and the red color chrominance component to the pixel if the pixel is located in the third region so as to render the pixel substantially achromic.

21. The device according to claim 20, wherein the means for identifying identifies the at least one of a blue color difference chrominance component and a red color difference chrominance component based on a decolorization key, KA.

22. The device according to claim 21, wherein said means for decolorizing calculates the decolorization key, KA, according to a formula, $$KA = z - F |u|,$$

where z and u are respective coordinates of pixels along the Z axis and a U axis, where the U axis arises from a rotation by an angle β1 of a blue color chrominance axis, CB, of the color-luminance space, |u| denoting an absolute value of the coordinate u, and F being an adjustment parameter.

23. The device according to claim 19, wherein said means for forming a subject video comprises means for setting the pixel to black if the pixel is located in the first colored region corresponding to the first colored background.

24. The device according to claim 19, wherein:
said means for calculating the clipping key KD comprises means for calculating coordinates of respective pixels of the color-luminance space in a frame of reference (U, V, W), the frame of reference (U, V, W) being a right-handed trihedral whose center is an achromic point of zero luminance and whose axis W points toward a point of color of the first colored background; and said means for separating comprises means for defining the first volume representing the first colored background as a cone of aperture angle α having the axis W as an axis of symmetry.

25. The device according to claim 24 further comprising means for elliptically modulating a cross-section of the cone of aperture angle α.

26. The device according to claim 25, wherein said means for separating comprises means for defining as the transition region a region of space included between the surface of the cone of aperture α defining the first colored background and a cone of aperture α1 greater than α, with the same axis of symmetry and the same vertex as the cone of aperture α, said transition region having a face opposite the vertex and co-planar with a face opposite the vertex of the cone of aperture α.

27. The device according to claim 26, wherein said means for separating comprises means for truncating the cone defining the first colored background at a distance d so as to separate a low luminance threshold region between a coordinate ws that defines a position of the vertex of the cone on the axis of symmetry W and a coordinate wb defining, on the said axis of symmetry, a low luminance threshold from a high luminance threshold bounded by a coordinate wh, where wb has a value lying between ws and wh.

28. The device according to claim 19, further comprising means for locating a shadow of said subject cast on the first colored background.

29. The device according to claim 28, wherein said means for locating a shadow comprises means for setting to black pixels representing the shadow of the subject.

30. A video mixer system configured to overlay a subject clipped from a first colored background of a source video image onto a second colored background of a final video image comprising:

means for calculating a clipping key;

means for separating a color-luminance space of the source video image into three regions based on the clipping key, comprising defining means for defining as a first region a first volume indicative of the first colored background, defining as a second region a second volume indicative of the subject, and defining as a third region a transition region between the first colored background and the subject;

means for forming a subject video comprising,
means for detecting into which of said three regions a pixel from the source video image is located, and
means for decolorizing the pixel if the pixel is located in the third region; and means for forming the final video image comprising,
means for mixing the clipping key, KD, with the subject video and a background video which is a video image of the second colored background, according to a formula $VD = KD \times \text{subject video} + (1-KD) \times \text{background video}.$ 31. An autonomous video image clipping and overlaying device configured to overlay a subject clipped from a first colored background of a source video image onto a second colored background of a final video image comprising:

source video image means configured to produce a source video image;

means for calculating a clipping key;

means for separating a color-luminance space of the source video image into three regions based on the clipping key, comprising defining means for defining as a first region a first volume indicative of the first colored background, defining as a second region a second volume indicative of the subject, and defining as a third region a transition region between the first colored background and the subject;

means for forming a subject video comprising,
means for detecting into which of said three regions a pixel from the source video image is located, and
means for decolorizing the pixel if the pixel is located in the third region;

means for forming the final video image comprising,
means for mixing the clipping key, KD, with the subject video and a background video which is a video image of the second colored background, according to a formula $VD = KD \times \text{subject video} + (1-KD) \times \text{background video}$; and display means for displaying the final video image.

* * * * *